United States Patent
Chen et al.

(10) Patent No.: US 8,547,642 B2
(45) Date of Patent: Oct. 1, 2013

(54) MULTI-BEAM, HIGH EFFICIENCY DIFFRACTIVE OPTICS SYSTEM FORMED IN A SINGLE SUBSTRATE

(75) Inventors: Ye Chen, Santa Clara, CA (US); Bing Shao, San Jose, CA (US); Pengyue Wen, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 653 days.

(21) Appl. No.: 12/603,744

(22) Filed: Oct. 22, 2009

(65) Prior Publication Data

US 2011/0096382 A1    Apr. 28, 2011

(51) Int. Cl.
*G02B 27/30* (2006.01)
*G02B 6/34* (2006.01)

(52) U.S. Cl.
USPC ............................................ 359/641; 385/37

(58) Field of Classification Search
USPC ..... 359/15, 569, 639, 641, 34, 558, 565–566, 359/572, 629, 636, 721, 724; 385/117, 119, 385/15, 31, 37; 600/101–183; 398/82, 84, 398/87, 141, 168–170, 200, 201, 212, 214; 349/202
See application file for complete search history.

(56) References Cited

U.S. PATENT DOCUMENTS

| | | | |
|---|---|---|---|
| 5,537,252 A | 7/1996 | Rauch | |
| 5,566,024 A | 10/1996 | Rauch | |
| 5,574,597 A * | 11/1996 | Kataoka | 359/569 |
| 5,615,022 A * | 3/1997 | Brandstetter et al. | 359/12 |
| 5,745,265 A * | 4/1998 | Hasegawa et al. | 359/15 |
| 7,052,175 B2 | 5/2006 | Hollander | |
| 2004/0201894 A1* | 10/2004 | Brown | 359/569 |
| 2006/0103905 A1 | 5/2006 | Walmsley | |
| 2007/0139779 A1* | 6/2007 | Smith et al. | 359/569 |
| 2007/0156051 A1* | 7/2007 | Pascal | 600/476 |
| 2009/0097725 A1 | 4/2009 | Krupnik et al. | |
| 2009/0185274 A1* | 7/2009 | Shpunt | 359/558 |

* cited by examiner

*Primary Examiner* — Alessandro Amari
*Assistant Examiner* — Kimberly N Kakalec

(57) ABSTRACT

An optics system is provided that is made up of a single diffractive optical element that performs beam collimating, beam splitting, and light blocking functions. The diffractive optical element is made up of a substrate having a first surface comprising an entrance facet and a second surface comprising an exit facet. The first surface comprising the entrance facet performs at least the functions of collimating the beam of light produced by the light source and of tilting the collimated beam in a particular direction. The second surface comprising the exit facet performs at least the functions of splitting the tilted collimated beam into at least two collimated light beams and of blocking unintended light (i.e., one or more mode order groups that are not intended to be used for imaging purposes). By performing all of these functions on different surfaces of a single substrate, an extremely compact optics system having very high optical efficiency and a very high signal-to-noise ratio is realized.

25 Claims, 9 Drawing Sheets

MULTI-BEAM, HIGH EFFICIENCY DIFFRACTIVE OPTICS SYSTEM FORMED IN A SINGLE SUBSTRATE

TECHNICAL FIELD OF THE INVENTION

The invention relates to a multi-beam, high-efficiency diffractive optics system formed on a single substrate.

BACKGROUND OF THE INVENTION

There is often a need in the medical industry for imaging systems that are extremely small in size. For example, miniature imaging systems are inserted into the human body and used to acquire images of features, which are used to diagnose diseases and disorders within the human body. One example of a miniature imaging system that is used in the medical industry is an endoscopy system. An endoscopy system is a miniature imaging system that is placed on the end of a long tube-like structure, which is inserted into the gastrointestinal digestive tract. As the tube-like structure is moved through the digestive tract, the imaging system captures images that are used to diagnose diseases and disorders of the gastrointestinal digestive tract. Another example of a medical imaging system is a capsule imaging system, which is a very tiny imaging system contained within a capsule having the same size and shape as a medicine pill. After being swallowed, the capsule travels along the gastrointestinal digestive tract. As the capsule travels along the digestive tract, the imaging system contained within the capsule records images that may be analyzed to diagnose diseases and disorders.

Because medical imaging systems of this type need to be extremely small in size, the components that are used in the imaging systems also need to be extremely small in size. The components of this type of medical imaging system include at least a light source for generating light and an optics system for collimating the light into a light beam and for directing the collimated light beam in a particular direction. The optics system may also need to be capable of blocking undesired wavelengths or orders of light so that only one or more desired wavelengths or orders of light is used to image features of interest. In addition, it may be desirable to produce multiple collimated beams, in which case the optics system also needs to include either a beam splitting element or an additional light source. If the optics system includes an additional light source, the optics system will typically also include additional refractive, diffractive and/or reflective elements for collimating the additional light beam and for directing the additional light beam in a particular direction. Furthermore, any beam splitting and light blocking functions should be performed with high efficiency to ensure that the intended beam or beams have the needed or desired amount of optical power.

Designing and implementing an optics system that is extremely small in size and, at the same time, is capable of performing all of these optical functions are very challenging tasks. Assuming, for example, the optics system includes beam collimating, beam splitting, and light blocking functionality, the optics system will typically include at least a first optical element for collimating the light beam produced by the light source, a second optical element for splitting the collimated light beam into multiple light beams, and a third optical element for blocking or suppressing undesired light. The arrangement of these optical elements typically consumes a significant amount of space, which may lead to the imaging system being undesirably large in size. Although it may be possible to perform the beam collimating and beam splitting functions with one optical element, another optical element is still needed to perform the light blocking/suppressing function. In such cases, the light-blocking/suppressing element will be located some distance away from the collimating and beam splitting optical element. For this reason, the arrangement of the two optical elements will still require the use of a significant amount of space. In addition, if the optical element that performs the beam collimating and beam splitting functions is not properly designed and implemented, it may produce undesired light outputs that result in a reduction in the optical efficiency and the signal to noise ratio of the optical system.

Accordingly, a need exists for an optics system that is capable of performing beam collimating, beam splitting and beam blocking functions with high efficiency and that can be implemented in an extremely small amount of space.

SUMMARY OF THE INVENTION

The invention is directed to a diffractive optical element and method for use in an optical imaging system. The diffractive optical element comprises a substrate having an entrance facet surface and an exit facet surface and having first and second diffractive patterns formed on the entrance and exit facet surfaces, respectively. Light produced by a light source enters the substrate through the entrance facet surface and exits the substrate through the exit surface facet surface. The substrate is spatially defined by coordinates of a coordinate system having at least first and second axes that are orthogonal to one another. The first axis passes through the substrate and the entrance and exit facet surfaces and is generally normal to the entrance facet surface.

In accordance with one illustrative embodiment, the first diffractive pattern formed on the entrance facet surface is configured to collimate light that enters the substrate through the entrance facet surface into a first collimated light beam and to tilt the first collimated light beam at a first tilt angle relative to the first axis. The second diffractive pattern formed on the exit facet surface is configured to split the first collimated light beam into at least second and third collimated light beams. The second and third collimated light beams are output from the diffractive optical element.

In accordance with another illustrative embodiment, the first diffractive pattern formed on the entrance facet surface is configured to collimate light that enters the substrate through the entrance facet surface into a first collimated light beam and to split the first collimated light beam into second and third collimated light beams. The second diffractive pattern formed on the exit facet surface is configured to split the second collimated light beam into at least fourth and fifth collimated light beams. The exit facet surface also refracts the third collimated light beam to form a refracted third collimated light beam. The refracted third collimated light beam and the fourth and fifth collimated light beams are output from the diffractive optical element.

In accordance with one illustrative embodiment, the method comprises producing a light beam with a light source, receiving the light beam on an entrance facet surface of a substrate of a single diffractive optical element, using a first diffractive pattern formed on the entrance facet surface to collimate the light beam produced by the light source into a first collimated light beam and tilting the first collimated light beam at a first tilt angle relative to the first axis, and with a second diffractive pattern formed on the exit facet surface, splitting the first collimated light beam into at least second and third collimated light beams such that the second and third collimated light beams are output from the diffractive optical element.

In accordance with another illustrative embodiment, the method comprises producing a light beam with a light source, receiving the light beam on an entrance facet surface of a substrate of a single diffractive optical element, with a first diffractive pattern formed on the entrance facet surface, collimating the light beam received on the entrance facet surface into a first collimated light beam and splitting the first collimated light beam into second and third collimated light beams, and with a second diffractive pattern formed on the exit facet surface, splitting the second collimated light beam into at least fourth and fifth collimated light beams and refracting the third collimated light beam to form a refracted third collimated light beam. The refracted third collimated light beam and the fourth and fifth collimated light beams are output from the diffractive optical element.

These and other features and advantages of the invention will become apparent from the following description, drawings and claims.

DETAILED DESCRIPTION OF AN ILLUSTRATIVE EMBODIMENT

In accordance with embodiments of the invention, an optics system is provided that is made up of a single diffractive optical element that performs beam collimating, beam splitting, and light blocking functions. The diffractive optical element is made up of a substrate having a first surface comprising an entrance facet and having a second surface comprising an exit facet. The first surface comprising the entrance facet performs at least the functions of collimating the beam of light produced by the light source and of tilting the collimated beam in a particular direction. The second surface comprising the exit facet performs at least the functions of splitting the tilted collimated beam into at least two collimated light beams and of suppressing or blocking unintended light (i.e., one or more diffractive orders that are not intended to be used for imaging purposes). By performing all of these functions on different surfaces of a single substrate, an extremely compact optics system having very high optical efficiency and a very high signal-to-noise ratio (SNR) is realized. Illustrative or exemplary embodiments of the multi-beam, high-efficiency diffractive optical element will now be described below with reference to the figures.

Figure 1:
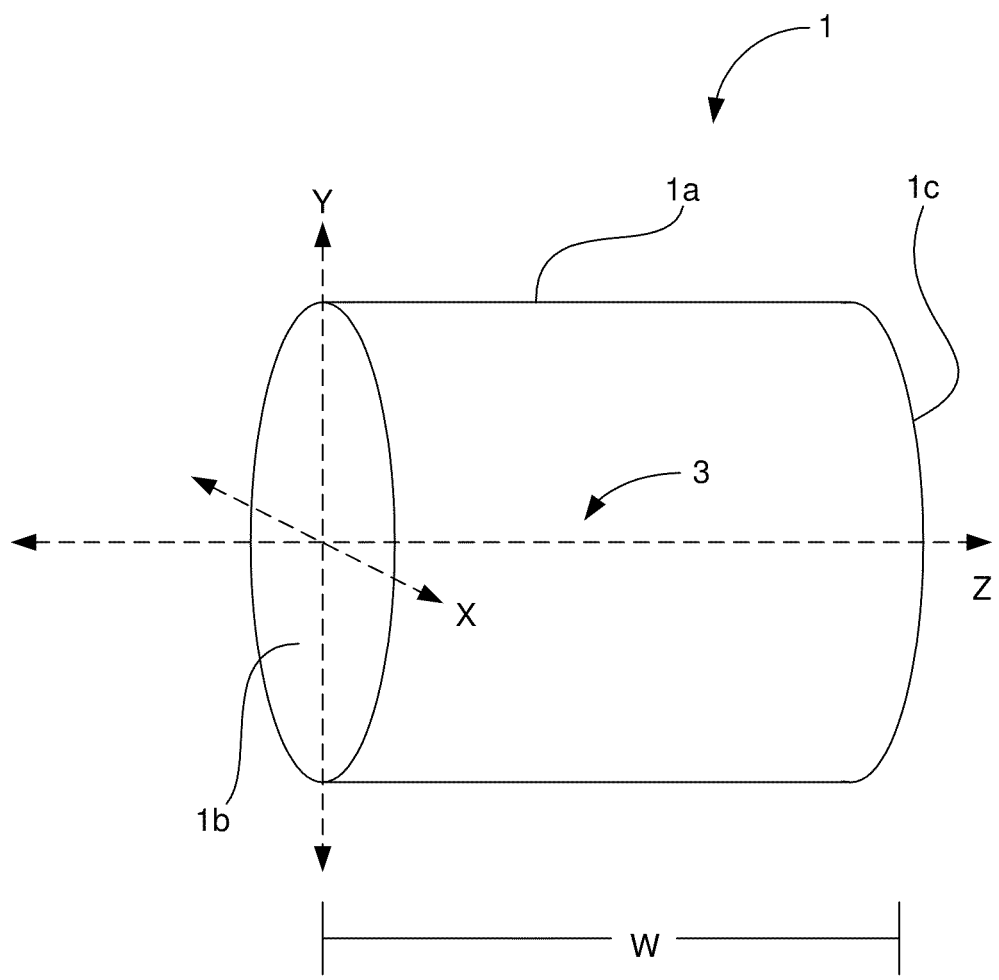
FIG. 1 illustrates a side perspective view of the diffractive optical element in accordance with an illustrative embodiment.

FIG. 1 illustrates a side perspective view of a single diffractive optical element 1 in accordance with an illustrative embodiment. In FIG. 1, the diffractive optical element 1 is shown positioned in a Cartesian Coordinate System defined by X, Y and Z axes. The diffractive optical element 1 comprises a substrate 1a having a first surface 1b that functions as an entrance facet of the optical element 1 and a second surface 1c that functions as an exit facet 1c of the optical element 1. The first and second surfaces 1b and 1c, respectively, are located on opposite sides of the substrate 1a. The Z axis of the Cartesian Coordinate System passes through the substrate 1a, the entrance facet surface 1b, and exit facet surface 1c and is generally normal to the entrance facet surface 1b. Although the exit facet surface 1c is shown as being generally parallel to the entrance facet surface 1b, in some embodiments the exit facet surface 1c may be tilted at an angle to the X, Y and/or Z axes such that the entrance and exit surfaces 1b and 1c are not generally parallel to one another.

The substrate 1a has some finite width, W, in the direction of the Z axis. The width W is equal to the distance between the first and second surfaces 1b and 1c, respectively. The X and Y axes of the Cartesian Coordinate System are orthogonal to one another and to the Z axis.

The substrate 1a may be made of, for example, glass, although the substrate 1a is not limited to any particular material or materials. The entrance facet surface 1b of the substrate 1a has a diffractive pattern formed therein. Likewise, the exit facet surface 1c of the substrate 1a has a diffractive pattern formed therein. The diffractive patterns and the optical operations that they perform are described below in detail with reference to FIGS. 2A-6.

Figure 2A:
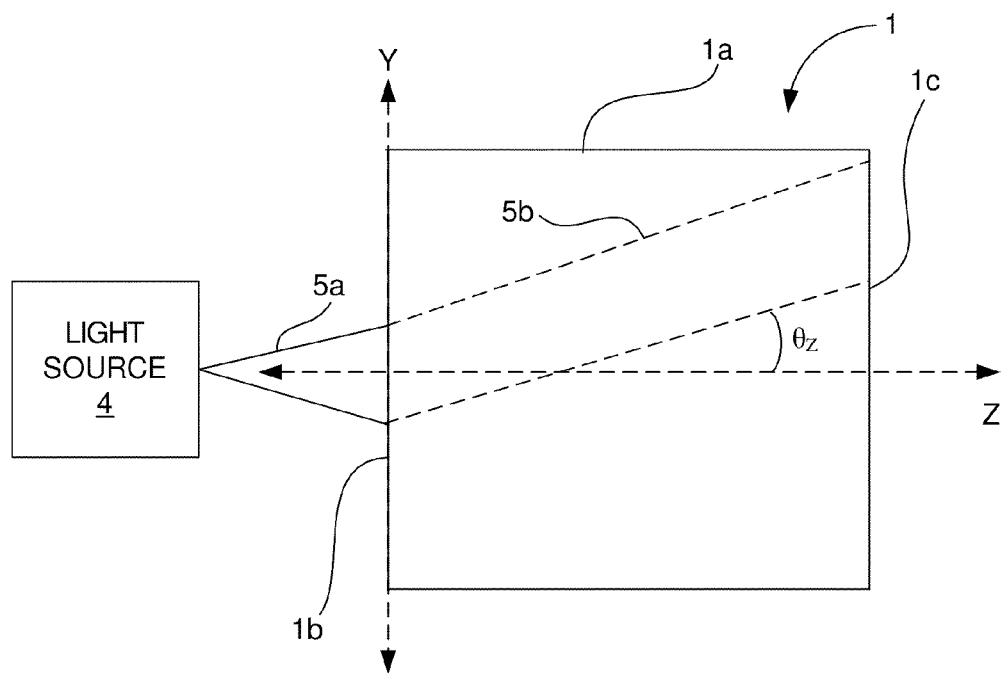
FIG. 2A illustrates a side plan view of an optical imaging system comprising the diffractive optical element shown in FIG. 1 and a light source that produces a light beam that is operated on by the diffractive optical element.

FIG. 2A illustrates a side plan view of an optical imaging system comprising the optical element 1 shown in FIG. 1 and a light source 4 that produces a light beam 5a. The light source 4 may be a light emitting diode (LED) or a laser diode, such as, for example, a vertical cavity surface emitting laser diode (VCSEL). The entrance facet surface 1b having the diffractive pattern (not shown) formed therein receives the light beam 5a as it diverges and collimates the diverging light beam 5a to produce a collimated light beam 5b. In addition, the entrance facet surface 1b tilts the collimated light beam 5b relative to the Z axis by a tilt angle, $\theta_Z$. For exemplary purposes, it will be assumed that the tilt angle $\theta_Z$ is 25°, although the invention is not limited to any particular angle or range of angles for the tilt angle $\theta_Z$. At the location where the collimated beam 5b is incident on the exit facet surface 1c, the collimated beam 5b has a particular spot size and is tilted at the tilt angle $\theta_Z$ relative to the Z axis. It should be noted that although FIG. 2A depicts an angular offset relative to the Z axis, the diffractive pattern formed on the entrance facet surface 1b may also, or instead, provide an angular offset relative to the X and/or Y axes of the Cartesian Coordinate System.

Figure 2B:
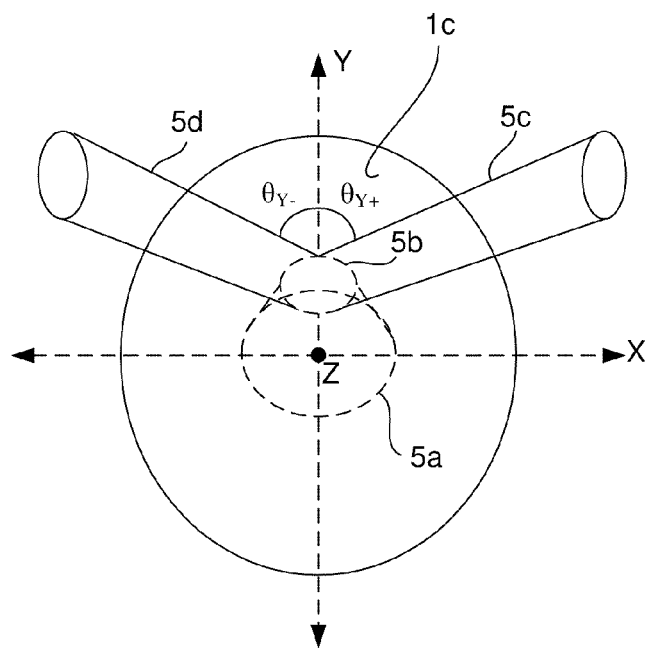
FIG. 2B illustrates a front plan view of the exit facet surface of the substrate shown in FIG. 1, which illustrates the manner in which the tilted collimated beam shown in FIG. 2A is split into two collimated light beams by the diffractive pattern formed on the exit facet surface.

FIG. 2B illustrates a front plan view of the exit facet surface 1c of the substrate 1a, which illustrates the manner in which the tilted collimated beam 5b shown in FIG. 2A is split into two collimated light beams 5c and 5d by the diffractive pattern formed on the exit facet surface 1c. The two collimated beams 5c and 5d are tilted at tilt angles $\theta_{Y+}$, and $\theta_{Y-}$, respectively, relative to the Y axis. In accordance with this illustrative or exemplary embodiment, the angles $\theta_{Y+}$, and $\theta_{Y-}$ are equal to about +25° and about −25°, respectively. Thus, the two collimated light beams 5c and 5d that pass out of the exit facet surface 1c are equally tilted relative to the Z axis due to the operations performed by the entrance facet surface 1b and are equally, but oppositely, tilted relative to the Y axis by the operations performed by the exit facet surface 1c. The divergence angle of each of the beams 5c and 5d is typically approximately 1.5° and the beam angle tolerance of each of the beams 5c and 5d is typically approximately +/−°2. The maximum spot size of each of the beams 5c and 5d is typically approximately 200 micrometers (microns). It should be noted, however, that the invention is not limited with respect to the tilt or divergence angles of the beams 5c and 5d or with respect to the spot sizes of the beams 5c and 5d.

Figure 3:
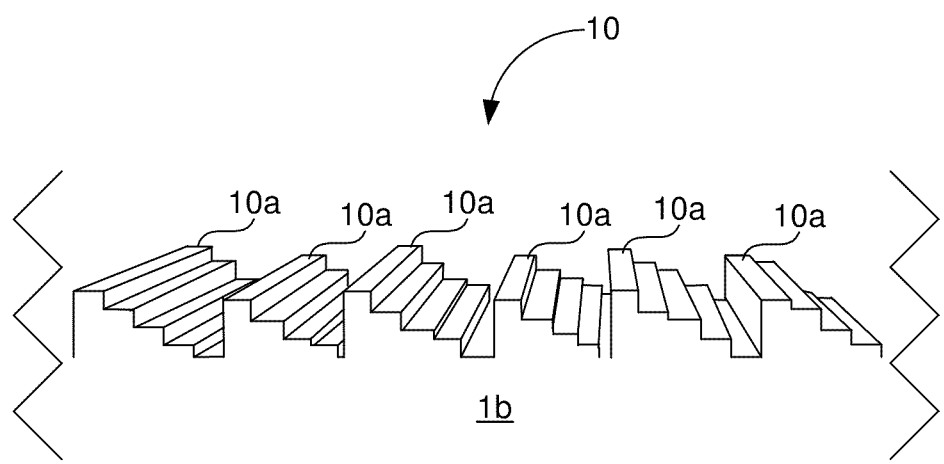
FIG. 3 illustrates a side perspective view of the diffractive pattern formed on the entrance facet surface of the substrate shown in FIG. 1.

FIG. 3 illustrates a side perspective view of the diffractive pattern 10 formed in the entrance facet surface 1b. The diffractive pattern 10 is a multi-surface pattern comprising a series of tiered structures 10a having dimensions that are determined by the optical function or functions that the diffractive pattern 10 is designed to perform. For exemplary purposes, it will be assumed that the diffractive pattern 10 is a phase hologram although the invention is not limited to any particular type of diffractive pattern or structure. For example, the diffractive pattern 10 could be an intensity hologram or an intensity and phase hologram. The design of the diffractive pattern 10 is generated using a computer software program that receives design criterion as input and produces a diffractive pattern design that meets the design criteria. For example, the design criterion typically include parameters such as, for example, (1) the tilt angle $\theta_Z$ of the collimated beam 5b, (2) the divergence angle of the collimated beam 5b, (3) the angle tolerance for the tilt angle $\theta_Z$, and (4) the maximum spot size of the collimated beam 5b. Known computer software programs exist that are suitable for use in designing the diffractive pattern 10.

Having provided the computer software program with this design criterion, the computer software program produces a computer-generated hologram (CGH) comprising phase values for X,Y coordinate locations on the entrance facet surface 1b. These phase values are mapped into spatial variations in the entrance facet surface 1b of the substrate 1a to create the multi-surface (i.e., tiered) diffractive pattern 10 shown in FIG. 3. The diffractive pattern 10 is then created by forming the spatial variations in the entrance facet surface 1b. Any one of a plurality of known methods for generating diffractive patterns may be used for this purpose, including, for example, imprinting techniques, photolithographic/etching techniques, and injection molding techniques. It should be noted, however, that the invention is not limited to any particular method for forming the diffractive pattern 10 in the entrance facet surface 1b.

Figure 4:
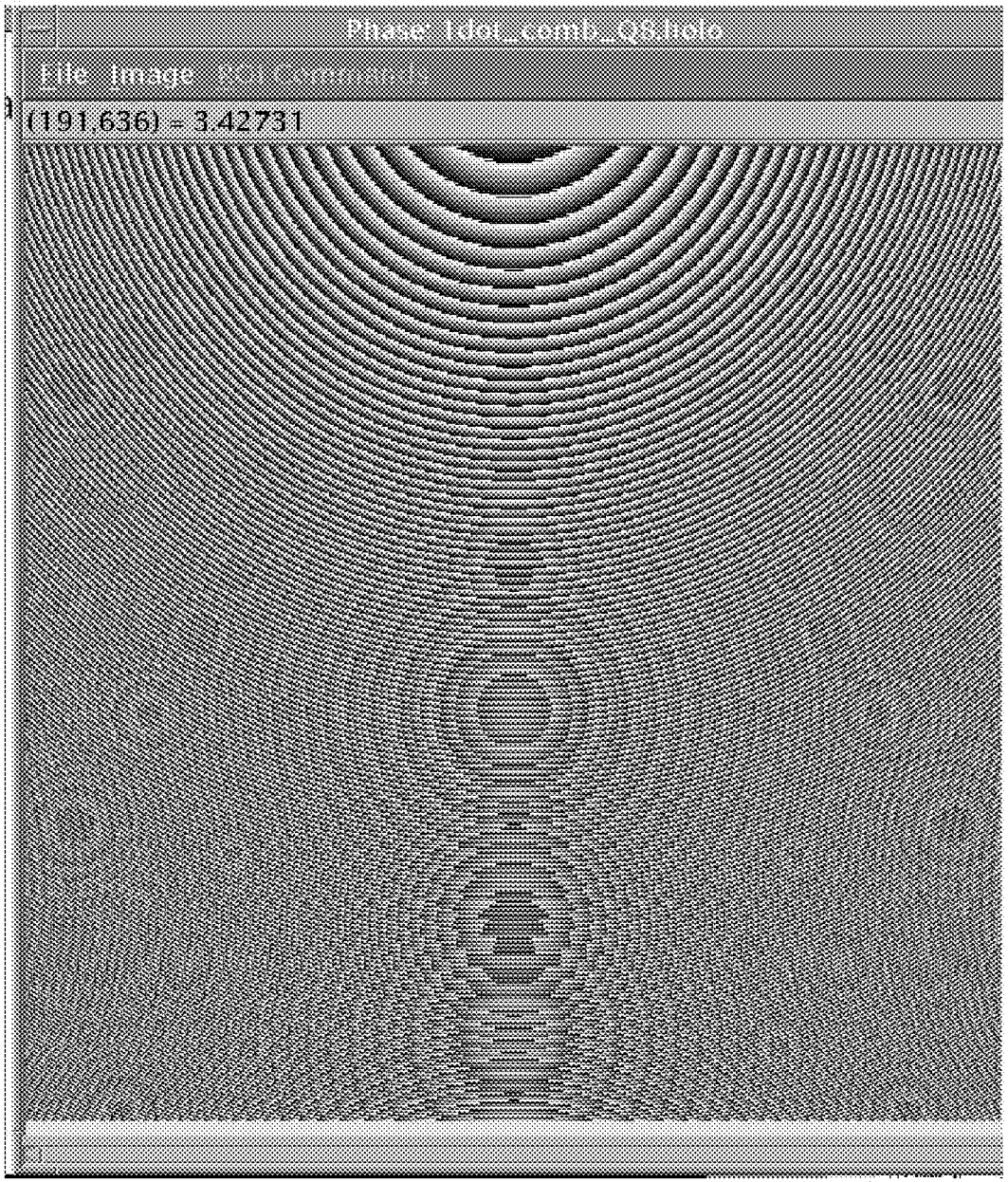
FIG. 4 illustrates a screen shot of an example of a phase hologram corresponding to the diffractive pattern shown in FIG. 3.

FIG. 4 illustrates a screen shot of an example of a phase hologram produced by the aforementioned computer software program during a simulation based on the following exemplary design criterion: (1) $\theta_Z$=25°; (2) maximum spot size=200 microns; (3) beam divergence angle for $\theta_Z \leq 1.5°$; and (4) beam angle tolerance=+/−2°. The phase hologram shown in the screen shot corresponds to a combination of the collimation and tilting operations performed by the diffractive pattern 10 shown in FIG. 3. The phase values that make up the phase hologram shown in the screen shot are mapped to depth variations (i.e., variations in the Z direction) in the entrance facet surface 1b, which are physically transferred to the entrance facet surface 1b using one of the aforementioned known techniques for creating diffractive patterns.

Some undesired diffractive orders may be produced by the diffractive pattern 10 (FIG. 3) formed on the entrance facet surface 1b. As will be described below with reference to FIG. 8, the diffractive pattern formed in the exit facet surface 1c may be designed and implemented in such a way that any undesired diffractive orders that are produced by the diffractive pattern 10 are suppressed or blocked by the diffractive pattern 20 (FIG. 5) formed on the exit facet surface. In addition, as will also be described with reference to FIG. 8, a light blocking material may be placed on portions of the exit facet surface that do not contain the diffractive pattern in order to block undesired diffractive orders that are not otherwise suppressed or blocked by the diffractive pattern formed on the exit facet surface.

Figure 5:
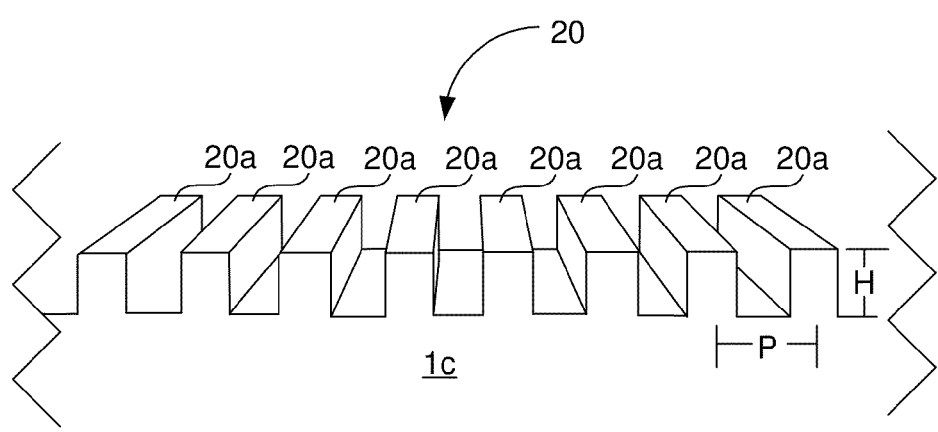
FIG. 5 illustrates a side perspective view of the diffractive pattern formed in the exit facet surface of the substrate shown in FIG. 1.

FIG. 5 illustrates a side perspective view of the diffractive pattern 20 formed in the exit facet surface 1c. In accordance with this illustrative embodiment, the diffractive pattern 20 is a binary pattern comprising a series of step structures 20a that are equal in height to one another and that are spaced apart from one another by a predetermined spacing, or pitch. The height, H, of the steps 20a may be, for example, one micron. The pitch, P, may be, for example, 1.8 microns. The step structures 20a repeat at a substantially constant period. The diffractive pattern 20 is formed on the exit facet surface 1c in the manner described above with reference to the diffractive pattern 10 shown in FIG. 3. However, the diffractive pattern 20 is easier to design and implement due to the fact that it is a binary diffractive pattern as compared to the more complicated tiered diffractive pattern 10 shown in FIG. 3. As indicated above with reference to FIG. 2B, the diffractive pattern 20 splits the collimated beam 5b into two collimated beams 5c and 5d. For exemplary purposes, it is assumed that the diffractive pattern 20 is a phase hologram although the invention is not limited to any particular type of diffractive pattern or structure. For example, the diffractive pattern 20 could be an intensity hologram or an intensity and phase hologram.

Figure 6:
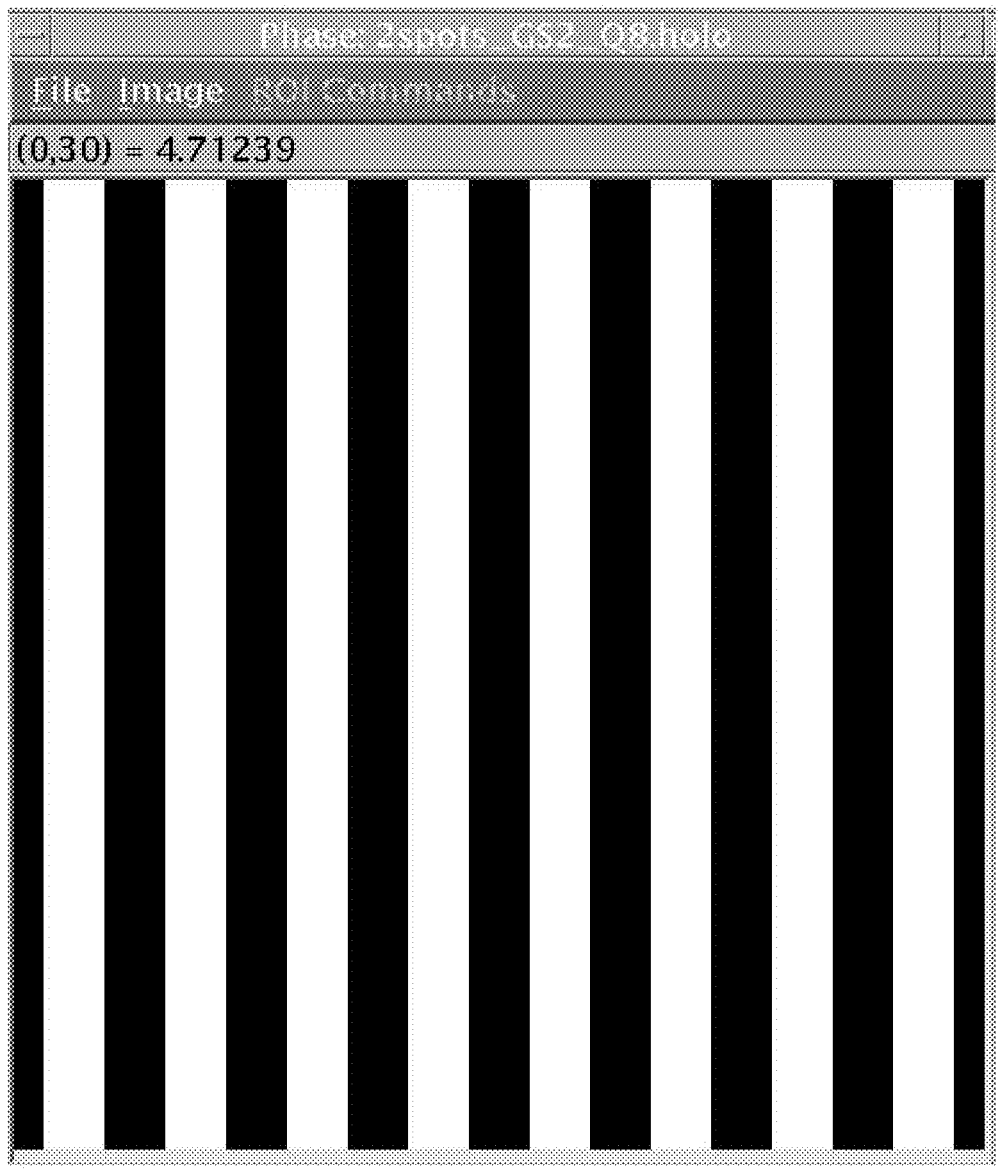
FIG. 6 illustrates a screen shot of an example of a phase hologram corresponding to the diffractive pattern shown in FIG. 5.

FIG. 6 illustrates a screen shot of an example of a phase hologram produced by the aforementioned computer software program during a simulation based on the following exemplary design criterion: (1) $\theta_{Y+}$=+25°; (2) $\theta_{Y-}$=−25°; (3) maximum spot size=200 microns; (4) beam divergence angle for $\theta_Z$=1.5°; and (5) beam angle tolerance=+/−2°. The phase values that make up the phase hologram shown in the screen shot of FIG. 6 are mapped to depth variations in the exit facet surface 1c (i.e., variations in the Z direction), which are physically transferred to the exit facet surface 1c using one of the aforementioned known techniques for creating diffractive patterns.

The values for the height, pitch and period are selected to provide very good suppression of side diffractive orders. Therefore, as indicated above, undesired diffractive orders that are produced by the diffractive pattern 10 (FIG. 3) formed on the entrance facet surface 1b are suppressed or blocked by the diffractive pattern 20 (FIG. 5) formed on the exit facet surface 1c. In addition, portions of the exit facet surface 1c that do not contain the diffractive pattern 20 may be covered with a blocking material that blocks one or more unintended diffractive orders, as will be described below with reference to FIG. 8.

With reference again to FIG. 1, using the two surfaces 1b and 1c to perform the optical operations described above provides greater optical efficiency and a better SNR than would be possible if all of the optical operations were performed by a single surface. Diffractive elements typically cause undesired diffractive orders to be produced in addition to the desired diffractive orders that the element is designed to produce. By using the exit facet surface 1c to perform the beam splitting and blocking functions, any undesired diffractive orders that are produced by the diffractive pattern 10 of the entrance facet surface 1b are blocked by the exit facet surface 1c. This decoupling of the optical functions performed by the entrance and exit facet surfaces 1b and 1c, respectively, allows the optical element 1 to have a high optical efficiency and a high SNR. In addition, these features reduce the electrical power consumption requirements of the light source 4 (FIG. 2A). Furthermore, because the entrance and exit facet surfaces 1b and 1c, respectively, are formed on a single substrate 1a, the width W of the optical element 1 (i.e., the Z-direction dimension) can be extremely small. For example, the width W of the optical element 1 may be 0.5 millimeters (mm). The dimensions in the X and Y directions are typically smaller than the width dimension W. The compact nature of the optical element 1 makes it highly suited for use in small optical imaging environments, such as in capsule imaging systems, for example. It should be noted that although the optical element 1 shown in FIG. 1 has a circular or cylindrical in shape, the invention is not limited with respect to the shape or dimensions of the optical element 1.

Figure 7:
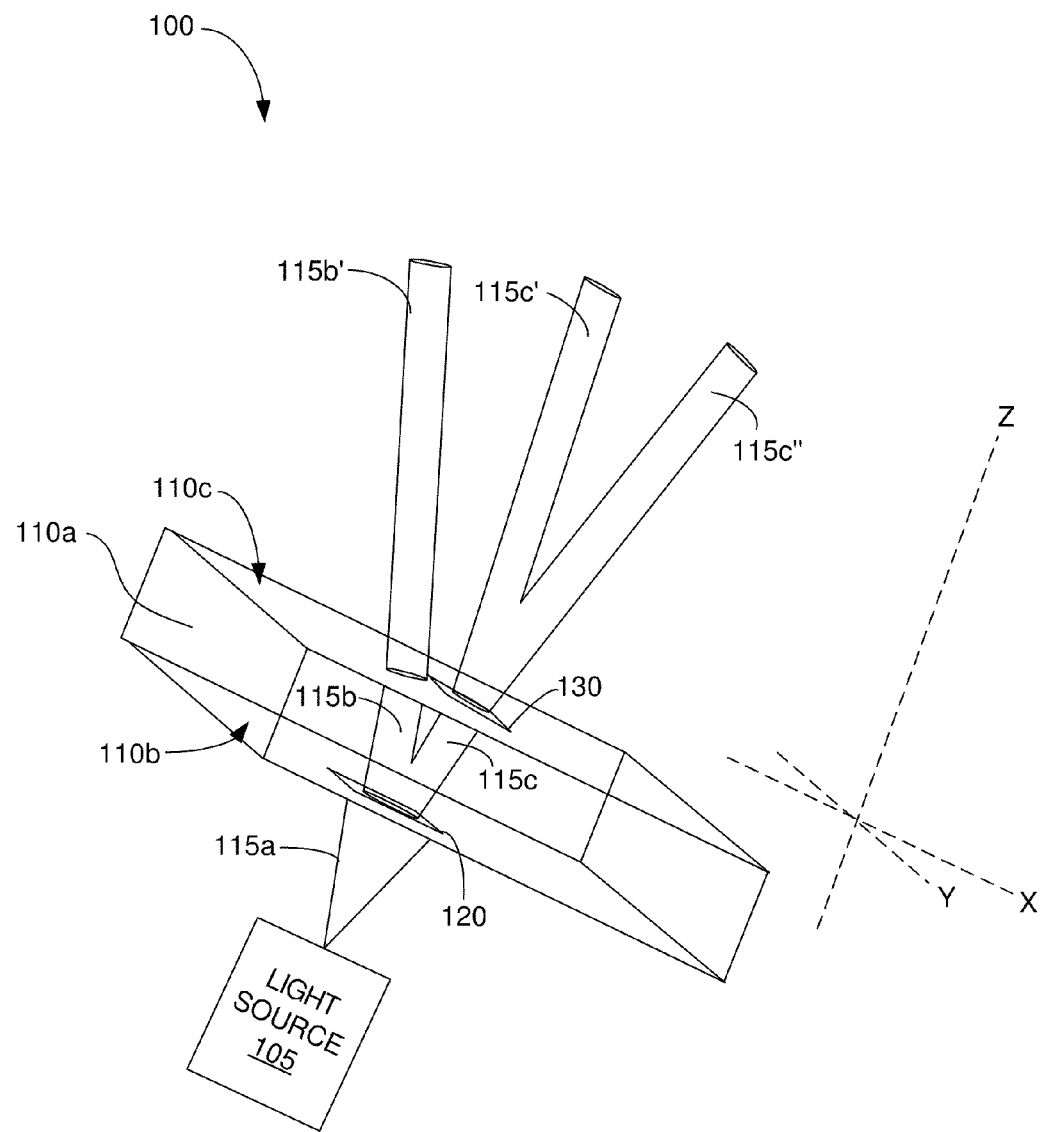
FIG. 7 illustrates a perspective view of the diffractive optical element in accordance with another illustrative or exemplary embodiment.

FIG. 7 illustrates a single diffractive optical element 100 in accordance with another illustrative or exemplary embodiment operating on light produced by a light source 105. Like the single diffractive element 1 shown in FIG. 1, the single diffractive element 100 shown in FIG. 7 comprises a single substrate 110a having an entrance facet surface 110b and an exit facet surface 110c. However, the entrance facet surface 110b and the exit facet surface 110c of the optical element 100 perform optical operations that are different from those performed by the entrance facet surface 1b and the exit facet surface 1c, respectively, of the optical element 1. The entrance and exit facet surfaces 110b and 110c have respective diffractive patterns 120 and 130 formed thereon that may be designed and formed in the manner described above with reference to FIGS. 3-6. However, different design criterion than that described above are used to design the respective diffractive patterns 120 and 130 formed on the surfaces 110b and 110c. Specifically, the diffractive pattern 120 formed on the entrance facet surface 110b performs collimation and beam splitting functions, whereas the diffractive pattern 130 formed on the exit facet surface 110c performs beam splitting and beam tilting functions. The diffractive patterns 120 and 130 may cover the entire surfaces 110b and 110c, respectively, or they may cover only portions of those surfaces through which light to be operated on passes.

The entrance facet surface 110b receives a diverging light beam 115a produced by the light source 105 and the diffractive pattern 120 collimates and splits the beam to form two collimated beams 115b and 115c. When the entrance facet surface 110b forms the collimated beams 115b and 115c, the entrance facet surface 110b also tilts the collimated beams 115b and 115c at tilt angles $\theta_Z = 25°$ and $0°$, respectively, relative to the Z axis. The diffractive pattern 130 formed on the exit facet surface 110c receives the collimated beam 115c and splits the beam 115c into two collimated beams 115c' and 115c'' and tilts the beams at tilt angles $\theta_{Y+}$ and $\theta_{Y-}$ of $+28°$ and $-28°$, respectively, relative to the Y axis. A portion of the exit facet surface 110c that does not contain the diffractive pattern refracts the collimated beam 115b to form a refracted collimated beam 115b'. The angle of refraction depends on the refractive index of the substrate 110a and the refractive index of the medium (e.g., air) that the refracted collimated beam 115b' enters as it exits the substrate 110a. Thus, three spatially-separated collimated light beams 115b', 115c' and 115c'' are output from the diffractive optical element 100. All three of these beams may be used for optical imaging. Alternatively, one of the beams, such as beam 115b', for example, may be used as optical feedback to monitor the optical power of the optical imaging system while one or both of the other beams 115c' and 115c'' are used for optical imaging.

The optical element 100 shown in FIG. 7 has many of the same advantages as the optical element 1 described above with reference to FIGS. 1-6. For example, the dimensions of the optical element 100 may be the same as those of the optical element 1, which makes the optical element 100 suitable for use in compact optical imaging systems. Like the optical element 1, the decoupling of the optical operations performed by entrance facet surface 110b and by exit facet surface 110c provides the aforementioned benefits of improved optical efficiency, high SNR and reduced power consumption by the light source 105. Like the substrate 1a shown in FIG. 1, the substrate 110a shown in FIG. 7 may be made of one or more of glass, plastics, polymers, and semiconductor materials, for example.

Figure 8:
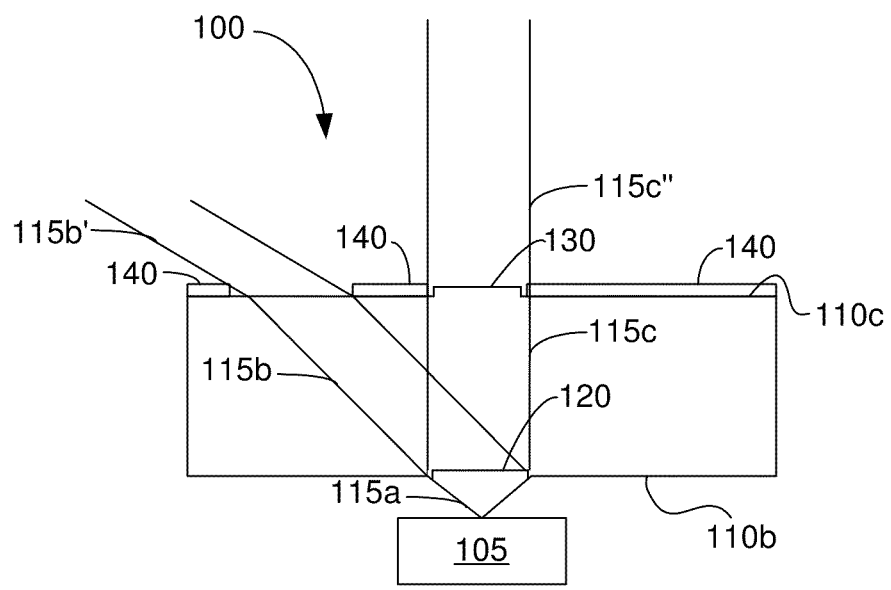
FIG. 8 illustrates a side plan view of an optical imaging system comprising the diffractive optical element shown in FIG. 7, a light source that produces a light beam that is operated on by the diffractive optical element, and a side order beam blocking feature on the exit facet surface of the diffractive optical element.

FIG. 8 illustrates a side plan view of the diffractive optical element 100 shown in FIG. 7 receiving light generated by the light source 105, which may be, for example, a VCSEL. In accordance with this illustrative embodiment, a light blocking material 140 is placed on portions of the exit facet surface 110c that do not contain the diffractive pattern 130 and on portions through which the refracted beam 115b' does not pass. This blocking material 140 blocks undesired or unintended diffractive orders propagating away from the entrance facet surface 110b in directions toward the exit facet surface 110c. As indicated above, the blocking material 140 may comprise, for example, one or more layers of dielectric material, a layer of metal, or a layer of light absorbing material (e.g., paint). Thus, any unintended or undesired diffractive orders that are not suppressed or blocked by the diffractive pattern 130 will be blocked by the blocking material 140.

Although the exit facet surface 110c is shown as being generally parallel to the entrance facet surface 110b, in some embodiments the exit facet surface 110c may be tilted at an angle to the X, Y and/or Z axes such that the surfaces 110b and 110c are not generally parallel to one another. Thus, the Z axis is generally normal to the entrance facet surface 110b, but may or may not be generally normal to the exit facet surface 110c, depending on whether the exit facet surface 110c is tilted.

The diffractive patterns 10, 20, 120, and 130 have been described above as performing one or more of beam collimation, beam splitting, and light suppression/blocking functions. However, the diffractive patterns 10, 20, 120, and 130 are not limited to performing only one or more of these functions. For example, the diffractive patterns 10, 20, 120, and 130 may be designed and implemented to also, or instead, perform functions of beam focusing to cause a beam to focus to a focal point and/or beam divergence to cause a focused or collimated beam to diverge (i.e., to spread out).

Figure 9:
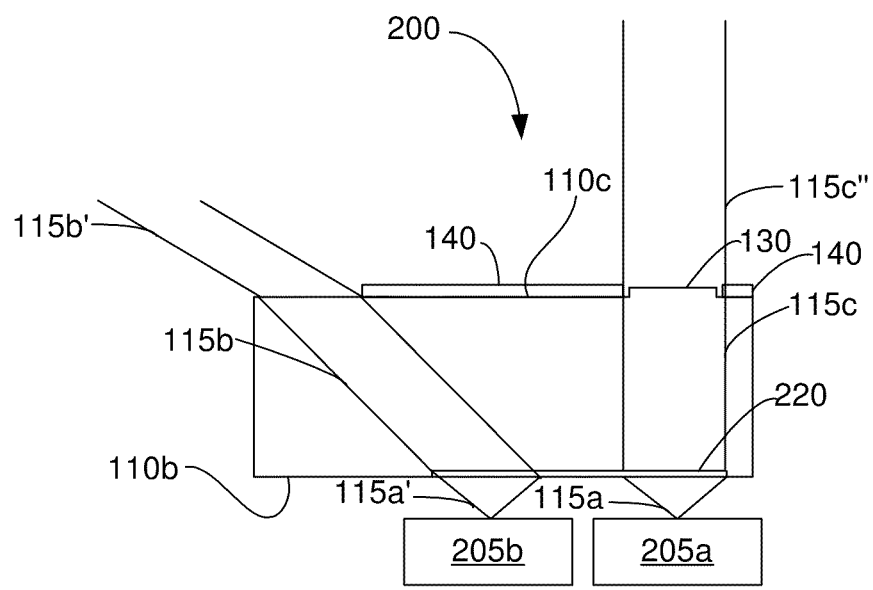
FIG. 9 illustrates a side plan view of the single-substrate diffractive optical element in accordance with another illustrative embodiment receiving and processing light generated by two light sources.

FIG. 9 illustrates a side plan view of the single-substrate diffractive optical element 200 in accordance with another illustrative embodiment, which receives light generated by two light sources 205a and 205b. The light sources 205a and 205b may be, for example, VCSELs. The diffractive optical element 200 may be identical or very similar to the diffractive optical element 100 shown in FIGS. 7 and 8. Therefore, like reference numerals in FIGS. 7, 8 and 9 represent like components or elements. In accordance with this illustrative embodiment, light sources 205a and 205b generate light beams 115a and 115a', respectively. Light source 205b shown in FIG. 9 corresponds to light source 105 shown in FIGS. 7 and 8. The beam 115a is collimated by diffractive pattern 220 formed on the entrance facet surface 110b to produce the aforementioned collimated beam 115c. The diffractive pattern 220 is similar to the diffractive pattern 120 shown in FIGS. 7 and 8 except that unlike the diffractive pattern 120, the diffractive pattern 220 does not perform any beam splitting or tilting functions on the beam 115a. The diffractive pattern 130 formed on the exit facet surface 110c shown in FIG. 9 may be identical to the diffractive pattern 130 shown in FIGS. 7 and 8. Thus the diffractive pattern 130 splits the beam 115c into two collimated beams 115c' and 115c" and tilts the beams 115c' and 115c" at tilt angles $\theta_{Y+}$, and $\theta_{Y-}$ of +28° and −28°, respectively, relative to the Y axis. The invention, however, is not limited to any particular tilt angles.

The diffractive pattern 220 formed on the entrance facet surface 110a extends far enough along the entrance facet surface 110b to receive the light beam 115a' produced by light source 205b. This portion of the diffractive pattern 220 collimates the beam 115a' to produce collimated light beam 115b and also tilts the collimated beam 115b at tilt a angle $\theta_Z$=25° relative to the Z axis. The invention, however, is not limited to this particular tilt angle. A portion of the exit facet surface 110c that does not contain the diffractive pattern 130 or the blocking material 140 refracts the collimated beam 115b to form a refracted collimated beam 115b'. The angle of refraction depends on the refractive index of the substrate 110a and the refractive index of the medium (e.g., air) that the refracted collimated beam 115b' enters as it exits the substrate 110a.

Like the diffractive optical element 100 shown in FIGS. 7 and 8, three spatially-separated, collimated light beams 115b', 115c' and 115c" are output from the diffractive optical element 200 shown in FIG. 9, although beam 115c' is not visible in the view shown in FIG. 9. The three beams 115b', 115c' and 115c" output from the diffractive optical element 200 shown in FIG. 9 are identical to the beams 115b', 115c' and 115c" output from the diffractive optical element 100 shown in FIGS. 7 and 8 except that the beams 115b', 115c' and 115c" output from the diffractive optical element 200 each have greater optical power levels than those of the beams 115b', 115c' and 115c", respectively, output from the diffractive optical element 100. The reason for the difference in the optical power levels of the beams is that two optical sources 205a and 205b (FIG. 9) instead of one optical source 105 (FIGS. 7 and 8) are used to produce the initial beams 115a and 115a'. The increased optical power levels of the beams 115b', 115c' and 115c" may be desirable or necessary in some imaging applications.

It should be noted that the functions that are performed by the diffractive patterns 220 and 130 shown in FIG. 9 are not limited to those depicted and described above with reference to FIG. 9. For example, even without tilting the collimated beam 115b relative to the Z axis, the output beams 115b', 115c' and 115c" will still be spatially separated. Therefore, the portion of the diffractive pattern 220 that receives the beam 115a' produced by the light source 205b may be configured to only collimate the beam 115a'. In the latter case, the spatial separation of the light sources 205a and 205b results in the beam 115b' being spatially separated from beams 115c' and 115c". Also, while the diffractive pattern 220 is shown in FIG. 9 as being a contiguous pattern, separate diffractive patterns may be formed in the regions on the entrance facet surface 110b where the two beams 115a and 115a' are received, with each pattern being configured to perform the respective functions described above with reference to FIG. 9.

When multiple light sources are used in the optical imaging system in the manner described above with reference to FIG. 9, the light sources may produce light of the same wavelength or of different respective wavelengths. The use of different wavelengths for this purpose may be useful for a variety of reasons, such as, for example, to obtain different spectral imaging results. Another reason for using different wavelengths might be to take advantage of the fact that diffractive patterns can be designed such that different wavelengths that overlap at the location where they impinge on the diffractive pattern have different focal lengths. This would allow light beams of different wavelengths to be spatially separated even if the beams spatially overlap where they are received on the diffractive pattern. Also, for two light beams of different wavelengths, but of the same diffractive order, the angles of diffraction provided by the diffractive pattern can be different for the two beams due to the two beams having different wavelengths. This is yet another way in which different wavelengths of light produced by different light sources can be used to yield spatially-separated, collimated output beams.

It should be noted that the invention has been described with respect to illustrative embodiments for the purpose of describing the principles and concepts of the invention. The invention is not limited to these embodiments. For example, although embodiments of the diffractive optical element have been spatially described in terms of a Cartesian Coordinate System, the diffractive optical element may instead be spatially described in terms of a Polar Coordinate System. The invention is not limited with respect to the shape or size of the diffractive optical element or with respect to the material or materials that are used to create the diffractive optical element. The invention also is not limited with respect to the optical operations that are performed by the entrance facet and exit facet surfaces or with respect to the number of collimated light beams that are output from the diffractive optical element. As will be understood by those skilled in the art in view of the description being provided herein, modifications may be made to the embodiments described to provide a torpedo that achieves the goals of the invention, and all such modifications are within the scope of the invention.

What is claimed is:

1. A diffractive optical element for use in an optical imaging system, the diffractive optical element comprising:
   a substrate comprising a substrate material, the substrate having an entrance facet surface and an exit facet surface, wherein light produced by a light source enters the substrate through the entrance facet surface and wherein light operated on by the diffractive optical element exits the substrate through the exit surface facet surface, wherein the substrate is spatially defined by coordinates of a coordinate system having at least first and second axes that are orthogonal to one another, and wherein the first axis passes through the substrate and the entrance and exit facet surfaces and is generally normal to the entrance facet surface;
   a first diffractive pattern formed on the entrance facet surface, the first diffractive pattern being configured to reshape a phase of the light that is produced by the light source and that enters the substrate through the entrance facet surface to form a first collimated light beam and to tilt the first collimated light beam at a first tilt angle relative to the first axis; and a second diffractive pattern formed on the exit facet surface, the second diffractive pattern being configured to split the first collimated light beam into at least second and third collimated light beams, and wherein the second and third collimated light beams are output from the diffractive optical element.

2. The diffractive optical element of claim 1, wherein the second diffractive pattern formed on the exit facet surface is also configured to tilt the second and third collimated light beams at second and third tilt angles, respectively, relative to the second axis.

3. The diffractive optical element of claim 2, wherein the second diffractive pattern is also configured to suppress one or more undesired diffractive orders of light other than one or more intended diffractive orders of light produced by the first diffractive pattern.

4. The diffractive optical element of claim 2, wherein the first diffractive pattern comprises multiple tiered structures formed in the entrance facet surface, wherein each tiered structure is made up of multiple tier surfaces formed at respective depths in the entrance facet surface, and wherein the depths of the tiers of the multiple tiered structures correspond to phase values of a phase hologram generated by a computer software program.

5. The diffractive optical element of claim 4, wherein the second diffractive pattern is a binary pattern of step structures, each step structure having a lower surface and an upper surface, each of the lower surfaces having equal widths and each of the upper surfaces having equal widths, and wherein all of the step structures have an equal distance between the respective upper and lower surfaces of the respective step structures.

6. The diffractive optical element of claim 5, wherein at least a portion of the exit facet surface on which the second diffractive pattern is not formed has a light blocking material thereon for blocking one or more undesired diffractive orders of light from passing out of the diffractive optical element through the exit facet surface.

7. The diffractive optical element of claim 1, wherein the diffractive optical element is part of a capsule optical imaging system.

8. A diffractive optical element for use in an optical imaging system, the diffractive optical element comprising:

a substrate comprising a substrate material, the substrate having an entrance facet surface and an exit facet surface, wherein light produced by a light source enters the substrate through the entrance facet surface and wherein light operated on by the diffractive optical element exits the substrate through the exit surface facet surface, wherein the substrate is spatially defined by coordinates of a coordinate system having at least first and second axes that are orthogonal to one another, and wherein the first axis passes through the substrate and the entrance and exit facet surfaces and is generally normal to the entrance facet surfaces;

a first diffractive pattern formed on the entrance facet surface, the first diffractive pattern being configured to collimate light that enters the substrate through the entrance facet surface into a first collimated light beam and to split the first collimated light beam into second and third collimated light beams; and a second diffractive pattern formed on the exit facet surface, the second diffractive pattern being configured to split the second collimated light beam into at least fourth and fifth collimated light beams, and wherein the exit facet surface refracts the third collimated light beam to form a refracted third collimated light beam, and wherein the refracted third collimated light beam and the fourth and fifth collimated light beams are output from the diffractive optical element.

9. The diffractive optical element of claim 8, wherein the first diffractive pattern is also configured to tilt at least one of the second and third collimated light beams at a tilt angle relative to the first axis.

10. The diffractive optical element of claim 9, wherein the second diffractive pattern is also configured to tilt at least one of the fourth and fifth collimated light beams at a tilt angle relative to the second axis.

11. The diffractive optical element of claim 8, wherein the second diffractive pattern is also configured to suppress one or more undesired diffractive orders of light.

12. The diffractive optical element of claim 8, wherein the first diffractive pattern comprises multiple tiered structures formed in the entrance facet surface, wherein each tiered structure is made up of multiple tier surfaces formed at respective depths in the entrance facet surface, and wherein the depths of the tiers of the multiple tiered structures correspond to phase values of a phase hologram generated by a computer software program.

13. The diffractive optical element of claim 8, wherein the second diffractive pattern is a binary pattern of step structures, each step structure having a lower surface and an upper surface, each of the lower surfaces having equal widths and each of the upper surfaces having equal widths, and wherein all of the step structures have an equal distance between the respective upper and lower surfaces of the respective step structures.

14. The diffractive optical element of claim 8, wherein at least a portion of the exit facet surface on which the second diffractive pattern is not formed has a light blocking material thereon for blocking one or more undesired diffractive orders of light from passing out of the diffractive optical element through the exit facet surface.

15. The diffractive optical element of claim 8, wherein the diffractive optical element is part of a capsule optical imaging system.

16. A method for generating multiple collimated light beams using a single diffractive element, the method comprising:

with a light source, producing a light beam;

receiving the light beam on an entrance facet surface of a substrate of the single diffractive optical element, the substrate comprising a substrate material, wherein the substrate is spatially defined by coordinates of a coordinate system having at least first and second axes that are orthogonal to one another, and wherein the first axis passes through the substrate and the entrance and exit facet surfaces and is generally normal to the entrance facet surfaces;

with a first diffractive pattern formed on the entrance facet surface, reshaping a phase of the light beam that is received on the entrance facet surface to form a first collimated light beam and tilting the first collimated light beam at a first tilt angle relative to the first axis; and with a second diffractive pattern formed on the exit facet surface, splitting the first collimated light beam into at least second and third collimated light beams such that the second and third collimated light beams are output from the diffractive optical element.

17. The method of claim 16, further comprising:
with the second diffractive pattern, tilting at least one of the second and third collimated light beams at a tilt angle relative to the second axis.

18. The method of claim 17, further comprising:
with the second diffractive pattern, suppressing one or more undesired diffractive orders of light created by the first diffractive pattern.

19. The method of claim 17, wherein the first diffractive pattern comprises multiple tiered structures formed in the entrance facet surface, wherein each tiered structure is made up of multiple tier surfaces formed at respective depths in the entrance facet surface, and wherein the depths of the tiers of the multiple tiered structures correspond to phase values of a phase hologram generated by a computer software program.

20. The method of claim 19, wherein the second diffractive pattern is a binary pattern of step structures, each step structure having a lower surface and an upper surface, each of the lower surfaces having equal widths and each of the upper surfaces having equal widths, and wherein all of the step structures have an equal distance between the respective upper and lower surfaces of the respective step structures.

21. The method of claim 20, wherein at least a portion of the exit facet surface on which the second diffractive pattern is not formed has a light blocking material thereon for blocking one or more undesired diffractive orders of light from passing out of the diffractive optical element through the exit facet surface.

22. The method of claim 16, wherein the method is used in a capsule optical imaging system.

23. A method for generating multiple collimated light beams using a single diffractive element, the method comprising:
with a light source, producing a light beam;
receiving the light beam on an entrance facet surface of a substrate of the single diffractive optical element, the substrate comprising a substrate material, wherein the substrate is spatially defined by coordinates of a coordinate system having at least first and second axes that are orthogonal to one another, and wherein the first axis passes through the substrate and the entrance and exit facet surfaces and is generally normal to the entrance facet surfaces;
with s first diffractive pattern formed on the entrance facet surface, collimating the light beam received on the entrance facet surface into a first collimated light beam and splitting the first collimated light beam into second and third collimated light beams; and
with a second diffractive pattern formed on the exit facet surface, splitting the second collimated light beam into at least fourth and fifth collimated light beams and refracting the third collimated light beam to form a refracted third collimated light beam, wherein the refracted third collimated light beam and the fourth and fifth collimated light beams are output from the diffractive optical element.

24. The method of claim 23, further comprising:
with the first diffractive pattern, tilting at least one of the third and fourth collimated light beams at a tilt angle relative to the first axis.

25. The method of claim 24, further comprising:
with the second diffractive pattern, tilting at least one of the fourth and fifth collimated light beams at a tilt angle relative to the second axis.

* * * * *